Figure 1:
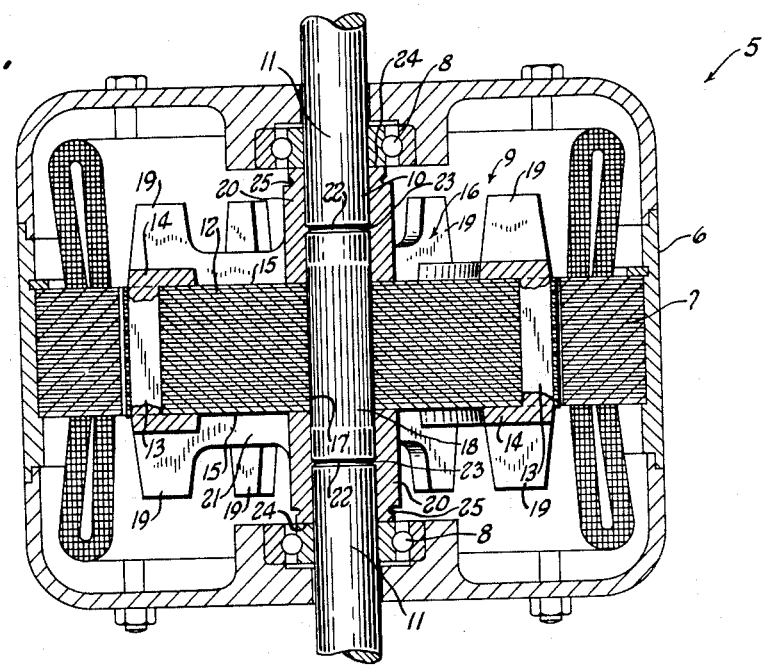

Jan. 5, 1965   E. B. SLEETER   3,164,736
SQUIRREL CAGE ROTOR
Filed March 2, 1960

Inventor
Edward B. Sleeter
By
Attorney

United States Patent Office 3,164,736
Patented Jan. 5, 1965

3,164,736
SQUIRREL CAGE ROTOR
Edward B. Sleeter, Wausau, Wis., assignor to Marathon Electric Manufacturing Corporation, Wausau, Wis., a corporation of Wisconsin
Filed Mar. 2, 1960, Ser. No. 12,366
2 Claims. (Cl. 310—211)

This invention relates to dynamoelectric machines and refers more particularly to the construction of a squirrel cage rotor having cast conductor bars, for induction motors and the like.

A squirrel cage rotor of the type here under consideration comprises a stack of substantially similar laminations coaxially secured to a shaft, conductor bars extending lengthwise through the stack of laminations in circumferentially spaced apart slots, and end rings that overlie the outer faces of the endmost laminations of the stack and electrically connect the conductor bars. Usually the end rings are cast integrally with the conductor bars, and the end rings thus perform the additional function of confining the laminations against axial separation.

The end portions of the rotor shaft are rotatably journaled in bearings mounted in the frame of the motor or other dynamoelectric machine of which the rotor is a part. In order to confine the shaft to rotation in the bearings it has heretofore been conventional to form the shaft with a medial portion of larger diameter than the end portions received in the bearings, thereby providing axially outwardly facing end thrust shoulders which engaged the inner ends of the bearings to prevent end play of the shaft. A shaft of this type had to be made from stock having a diameter no smaller than the large diameter medial portion of the finished shaft, and besides the high cost of this relatively heavy stock, additional expenses were involved in the labor and waste required in cutting down the stock to form the journal portions at the ends of the shaft.

By contrast with this past practice it is an object of this invention to provide a squirrel cage rotor of the character described having a shaft which is of uniform diameter along substantially its entire length, and which diameter need be no greater than is required to provide satisfactory journal portions on the shaft, so that the rotor of this invention can be manufactured at substantially less cost in labor and shaft material than previous rotors.

More specifically, it is an object of this invention to provide a squirrel cage rotor of the character described having a shaft with a relatively small uniform diameter along substantially its entire length, and wherein a unitary casting which comprises the conductor bars and end rings reinforces and stiffens the rotor structure to compensate for any lack of rigidity in the shaft and also provides end thrust receiving surfaces which cooperate with the bearings to confine the rotor to rotation and prevent end play.

It is thus apparent that it is another general object of this invention to provide a rotor construction which is extremely rigid and sturdy because of the fact that the cast structure that includes the conductor bars performs a structural function in cooperation with the laminations, to afford reinforcement to the shaft, but which rotor structure is nevertheless very inexpensive and simple to manufacture because its shaft may be fabricated, with very little machining, from stock having a uniform rather small diameter along its entire length, and because the structure which reinforces the shaft may be formed in a single conventional casting operation by which the conductors bars and end rings are also formed.

Another object of this invention resides in the provision of a rigid and sturdy squirrel cage rotor having the desirable features set forth in the foregoing statements of objects and which may be manufactured at very low cost because the lamination stack is directly assembled onto the shaft before the conductor bars and end rings are cast, rather than being assembled onto a mandrel which must be removed after the casting operation.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

Figure 2:
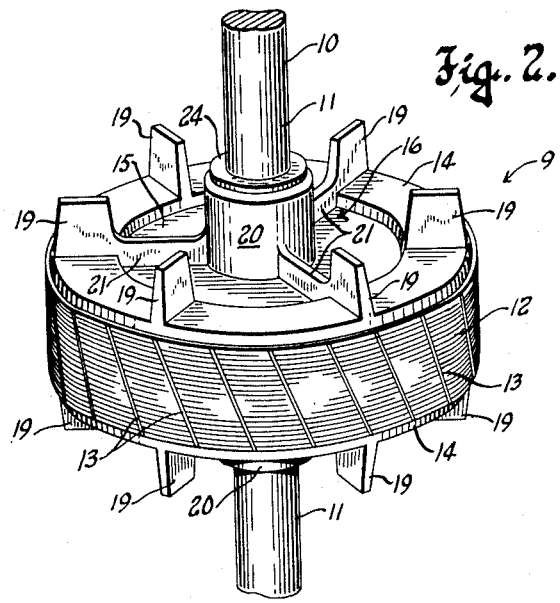

The accompanying drawing illustrates one complete example of the physical embodiment of the invention constructed according to the best mode so far devised for the practical application of the principles thereof, and in which:

FIGURE 1 is a longitudinal sectional view of a motor having a rotor which embodies the principles of this invention; and FIGURE 2 is an end perspective view of a squirrel cage rotor made in accordance with this invention.

Referring now to the accompanying drawings, the numeral 5 designates generally a dynamoelectric machine comprising a frame 6 which supports a wound stator 7 and bearings 8. Cooperating with the stator is a rotor 9 that embodies the principles of this inventions, and which has a coaxial shaft 10, the end portions 11 of which are journaled in the bearings 8. While shown as ball bearings, the bearings 8 could equally well be of any other suitable type. The frame and stator of the machine may be conventional in all respects, and in fact it is one of the features of the rotor of this invention that it may be used as a direct replacement for a conventional rotor without requiring any alteration of the stator or frame.

In general the rotor 9 comprises a stack of substantially identical laminations 12 coaxially secured on the medial portion of the shaft 10, conductor bars 13 that extend lengthwise along the full length of the lamination stack in circumferentially spaced apart slots that open to the peripheries of the laminations, and end rings 14 that are integrally connected with the ends of the conductor bars and overlie the outer faces 15 of the endmost laminations of the stack. The rotor also features a spider-like end member 16 that overlies the outer face of each end lamination and which is described more in detail hereinafter.

While the rotor of this invention is shown, by way of illustration, as having its conductor bars 13 disposed in slots that open to the rotor periphery, it will be understood that the invention is equally applicable to rotors having their conductor bars in so-called "tunnel" or bridged slots as well as those having them in the more usual semi-closed slots illustrated.

The shaft 10 of the rotor may comprise a straight piece of stock having a uniform diameter along its entire length. The diameter of the shaft is determined by the required diameter of the journal portions 11 at its ends, and it will thus be seen that the medial portion of the shaft may be unusually slender as compared with the medial portions of previous rotor shafts. Obviously the small stock required for the shaft of the rotor of this invention is less expensive than stock having a diameter equal to the thicker medial portion heretofore conventional in squirrel cage rotor shafts, and the present rotor attains a further reduction in cost by reason of the elimination of the machining formerly required on the end portions of the shaft stock to cut them down to the diameter of the bearing journals.

Attention is directed to the fact that the assembly of the laminations onto the shaft can be the first step in the assembly of the rotor of this invention, as contrasted with the common practice of first assembling the rotor laminations onto a mandrel, which is withdrawn from the lamination stack after the conductor bars and end rings are cast. The shaft 10 is pressed into a central bore 17 in the laminations, and to assure that the shaft has a snug, nonrotatable fit in the laminations the medial portion of the shaft may be knurled, as at 18, or is otherwise made an interference fit.

The assembly consisting of the shaft and the laminations is then placed in a suitable mold or die, by which the shaft is held accurately perpendicular to the laminations, and the conductor bars 13, end rings 14 and spider-like end members 16 are cast as a unit in a single operation. Details of the die and the casting operation will be readily understood by those skilled in the art. If desired, fan blades 19, integral with the end rings and projecting axially outwardly from them may be formed in the same operation.

Each spider-like end member 16 comprises a hub portion 20 that concentrically embraces the shaft, and a plurality of spoke-like runners or connecting members 21 which extend radially outwardly from the hub portion to its adjacent end ring 14 and which are integral with both the hub portion and the end ring. It will now be apparent that the spider-like end members 16 provide a rigid connection between the shaft and the conductor bars, through the end rings, so that the entire casting which includes the end members 16, end rings 14 and conductor bars 13 cooperates with the closely confined laminations and the shaft in affording longitudinal rigidity to the entire rotor structure, thus compensating for any lack of stiffness in the shaft due to its relatively small diameter medial portion.

The spider-like end members also cooperate with the end rings in preventing axial separation of the laminations, since the hub portions 20 are directly engaged with the outer faces 15 of the endmost laminations and thus confine the lamination stack between them. To assure against axial shifting of the hub portions 20 relative to the shaft, the hub portions and shaft may be provided with interengaging circumferential lands and grooves. Preferably a circumferential groove 22 is cut in the shaft at each of two locations where it is to be embraced by a hub portion 20, and then when the casting operation is performed metal flows into these grooves to form complementary lands or ridges 23 on the hub portions.

It will be seen that the hub portions also provide, at their outer ends, axially outwardly facing circumferential thrust receiving shoulders 24 that cooperate with the inner faces of the bearings 8 to confine the shaft against end play. If desired, an oil control groove 25 may be formed in each hub portion at the time the thrust receiving shoulder 24 is machined on it.

From the foregoing description taken together with the accompanying drawing it will be apparent that this invention provides an inexpensive squirrel cage rotor having a shaft of uniform diameter along substantially its entire length, so that the rotor shaft may be formed from inexpensive stock with very little machining, but which rotor nevertheless has very adequate end thrust receiving surfaces that are cooperable with the bearings to prevent axial play of the shaft and has great structural rigidity because its conductor bars are rigidly connected with the shaft through spider-like end members integral with the end rings, which spider-like members also serve to confine the laminations against axial separation. It will also be apparent that the rotor of this invention requires no more assembly labor than previous rotors, since the laminations can be directly assembled onto the shaft and the conductor bars, end rings and spider-like end members can be formed in a single casting operation.

What is claimed as my invention is:

1. In a squirrel cage rotor for a dynamoelectric machine, of the type comprising a coaxial stack of substantially similar annular laminations, an end ring coaxially overlying the outer face of each end lamination in the stack, and conductor bars connecting the end rings and extending across the stack of laminations in circumferentially spaced apart slots in the peripheral portion of the stack: a shaft having a diameter along substantially its entire length which is substantially equal to the diameter of the central holes in the laminations, the medial portion of the shaft being tightly received directly in the central holes of the laminations; a hub overlying the outer face of each endmost lamination and snugly embracing the adjacent portion of the shaft; and substantially radially disposed spokes extending from each hub to the adjacent end ring and bearing directly against the adjacent endmost lamination of the stack; the hubs, spokes, end rings and conductor bars being one integral casting so that the two hubs cooperate with the end rings, the conductor bars and the closely confined laminations to stiffen the medial portion of the shaft, and the hubs serve as axial thrust receiving members by which the rotor is held against shifting axially in bearings in which it may be journalled.

2. In a squirrel cage rotor the structure of claim 1 further characterized by interengaging axially facing shoulders integral with the hubs and the shaft to positively secure the shaft and the hubs and the stack of laminations therebetween against relative axial displacement.

References Cited in the file of this patent
UNITED STATES PATENTS

| | | |
|---|---|---|
| 1,190,054 | Wiard | July 4, 1916 |
| 1,371,233 | Fries | Mar. 15, 1921 |
| 1,554,702 | Bergman | Sept. 22, 1925 |
| 2,447,657 | Ludwig et al. | Aug. 24, 1948 |
| 2,753,473 | Hamm | July 3, 1956 |

FOREIGN PATENTS

| | | |
|---|---|---|
| 16,811 | Great Britain | of 1909 |